US009515493B2

(12) United States Patent
Chiyo et al.

(10) Patent No.: US 9,515,493 B2
(45) Date of Patent: Dec. 6, 2016

(54) POWER FEEDING COIL UNIT AND WIRELESS POWER TRANSMISSION DEVICE

(71) Applicant: TDK CORPORATION, Tokyo (JP)

(72) Inventors: Noritaka Chiyo, Tokyo (JP); Takeshi Kamono, Tokyo (JP); Mitsunari Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 45 days.

(21) Appl. No.: 14/549,094

(22) Filed: Nov. 20, 2014

(65) Prior Publication Data

US 2015/0145342 A1 May 28, 2015

(30) Foreign Application Priority Data

Nov. 28, 2013 (JP) ................................. 2013-246447

(51) Int. Cl.
*H01F 27/24* (2006.01)
*H02J 5/00* (2016.01)
*H01F 38/14* (2006.01)
*H01F 38/00* (2006.01)
*H01F 27/42* (2006.01)
(Continued)

(52) U.S. Cl.
CPC .............. *H02J 5/005* (2013.01); *H01F 27/24* (2013.01); *H01F 27/30* (2013.01); *H01F 27/38* (2013.01); *H01F 27/42* (2013.01); *H01F 37/00* (2013.01); *H01F 38/00* (2013.01); *H01F 38/14* (2013.01); *H01F 3/10* (2013.01)

(58) Field of Classification Search
CPC . H01F 5/00; H01F 27/00–27/30; H01F 27/42; H01F 37/00; H01F 38/00

USPC .......... 307/104; 336/65, 200, 232, 170, 173, 336/214–215
See application file for complete search history.

(56) References Cited

U.S. PATENT DOCUMENTS 4,873,677 A 10/1989 Sakamoto et al.
7,271,569 B2 * 9/2007 Oglesbee ................ H02J 7/025
320/108
(Continued)

FOREIGN PATENT DOCUMENTS

JP S64-23730 A 1/1989
JP H06-225482 A 8/1994
(Continued)

OTHER PUBLICATIONS

May 19, 2015 Extended Search Report issued in European Patent Application No. 14194982.6.
(Continued)

*Primary Examiner* — Tuyen Nguyen
(74) *Attorney, Agent, or Firm* — Oliff PLC

(57) ABSTRACT

A power feeding coil unit includes a first power feeding coil and a second power feeding coil that generate a first magnetic flux, a first auxiliary coil that generates a second magnetic flux interlinking with the first power feeding coil, and a second auxiliary coil that generates a third magnetic flux interlinking with the second power feeding coil. An axial direction of the first auxiliary coil is nonparallel to an axial direction of the first power feeding coil, and an axial direction of the second auxiliary coil is nonparallel to an axial direction of the second power feeding coil. A direction of circulation of the second and third magnetic fluxes are opposite to a direction of circulation of the first magnetic flux.

16 Claims, 6 Drawing Sheets

(51) Int. Cl.
*H01F 27/30* (2006.01)
*H01F 37/00* (2006.01)
*H01F 27/38* (2006.01)
*H01F 3/10* (2006.01)

(56) References Cited

U.S. PATENT DOCUMENTS

| | | | |
|---|---|---|---|
| 7,323,964 B1* | 1/2008 | Shyu | H01F 38/14 336/131 |
| 8,508,184 B2 | 8/2013 | Sakakibara et al. | |
| 2002/0079863 A1 | 6/2002 | Abe et al. | |
| 2012/0074899 A1 | 3/2012 | Tsai et al. | |
| 2013/0093252 A1* | 4/2013 | Norconk | H02J 5/005 307/104 |
| 2014/0084697 A1 | 3/2014 | Yasuda et al. | |
| 2015/0332827 A1* | 11/2015 | Omori | H01F 38/14 307/104 |

FOREIGN PATENT DOCUMENTS

| | | |
|---|---|---|
| JP | H07-231586 A | 8/1995 |
| JP | H08-223094 A | 8/1996 |
| JP | H09-65502 A | 3/1997 |
| JP | H09-74034 A | 3/1997 |
| JP | H09-283346 A | 10/1997 |
| JP | 2002-199598 A | 7/2002 |
| JP | 2010-172084 A | 8/2010 |
| JP | 2011-234496 A | 11/2011 |
| JP | 2012-151311 A | 8/2012 |
| JP | 2013-039027 A | 2/2013 |
| JP | 5253607 B1 | 7/2013 |
| JP | 2013-207727 A | 10/2013 |
| WO | 2013/172336 A1 | 11/2013 |
| WO | 2014/119296 A1 | 8/2014 |

OTHER PUBLICATIONS

Jun. 1, 2015 Extended Search Report issued in European Patent Application No. 14194935.4.
May 30, 2016 Office Action issued in Chinese Application No. 201410707722.0.
Jul. 5, 2016 Office Action Issued in U.S. Appl. No. 14/549,118.
Jul. 28, 2016 Office Action Issued in U.S. Appl. No. 14/548,950.
Jul. 1, 2016 Office Action Issued in U.S. Appl. No. 14/548,420.
Jul. 18, 2016 Office Action issued in Chinese Application No. 201410714380.5.

* cited by examiner

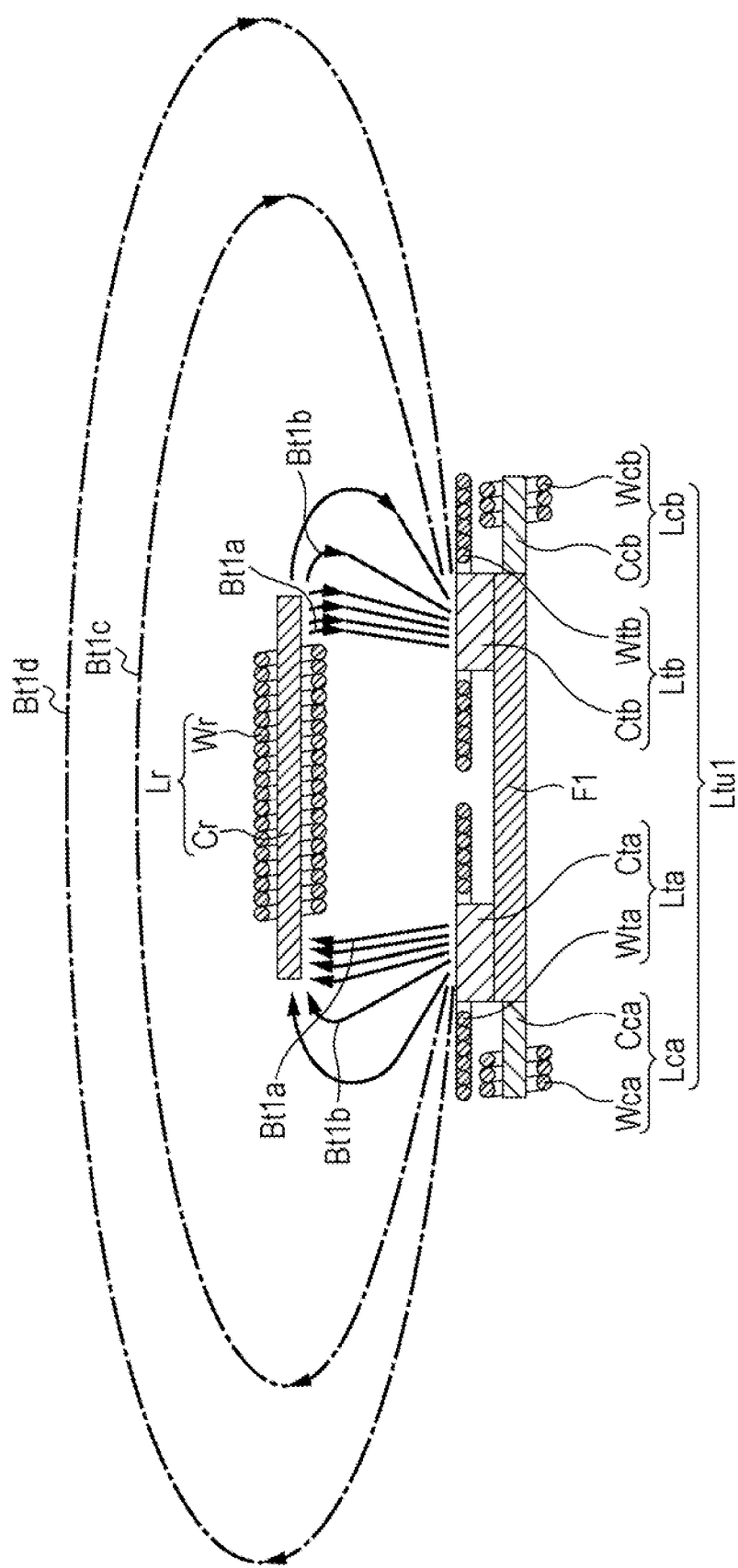

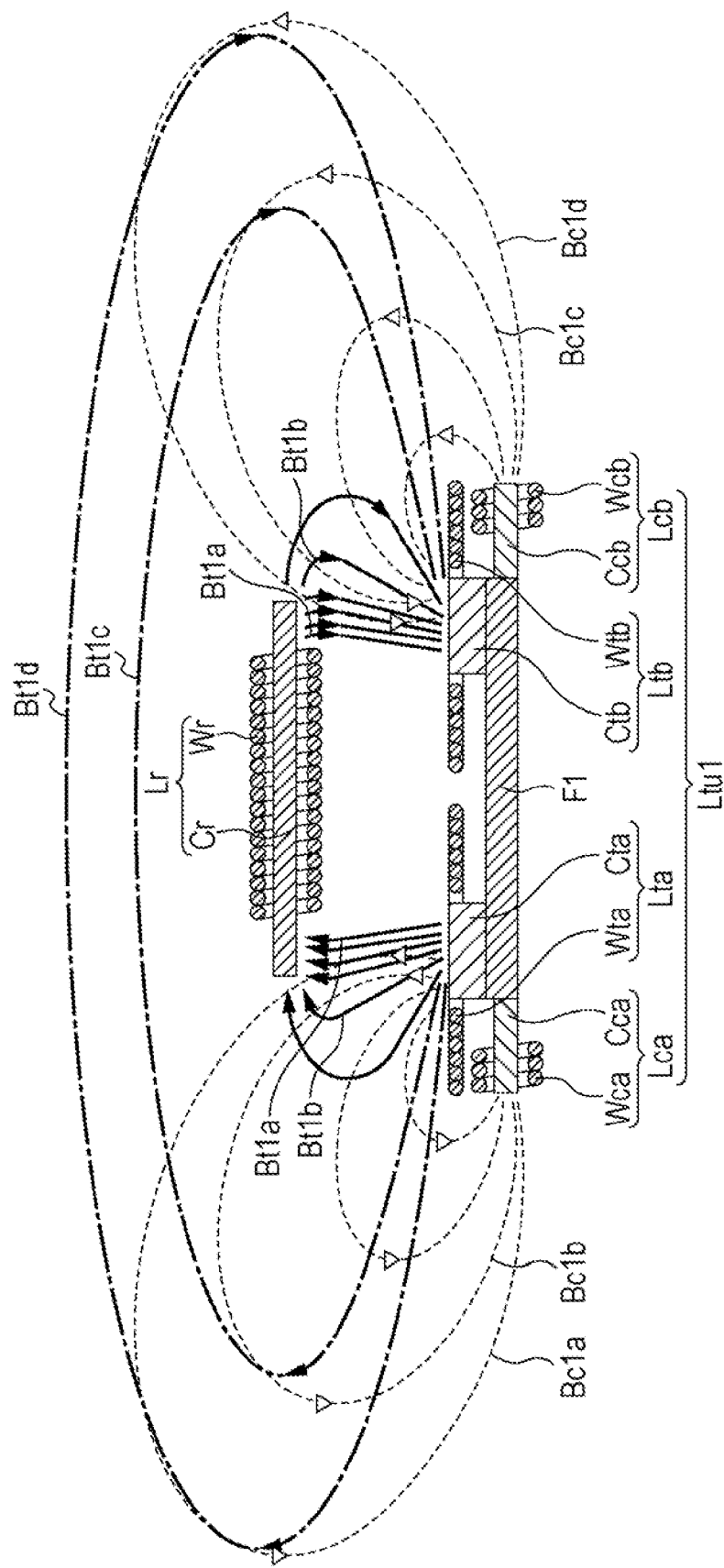

POWER FEEDING COIL UNIT AND WIRELESS POWER TRANSMISSION DEVICE

BACKGROUND OF THE INVENTION

1. Field of the Invention

The present invention relates to a power feeding coil unit and a wireless power transmission device for wireless transmission of power.

2. Description of the Related Art

Wireless power transmission technology that utilizes an electromagnetic induction effect between a primary (power feeding) coil and a secondary (power receiving) coil that face each other to transmit power without any mechanical contact such as a cable has attracted attention recently.

The application of the wireless power transmission technology described above to, for example, secondary battery chargers for electronic devices and the like has been attempted, and there has been an increasing demand for the development of a technology that allows high-efficiency and low-loss power transmission.

To meet such a demand, for example, Japanese Unexamined Patent Application Publication No. 01-23730 proposes a charger including a coil unit for excitation which includes a plate-shaped coil yoke and a pair of charging coils arranged in a planar array on the coil yoke so that magnetic poles are created vertically, and magnetic poles are opposite to each other. Japanese Unexamined Patent Application Publication No. 01-23730 discloses that, in the described charger, the magnetic poles on the individual charging coils are oriented in opposite directions, thereby enabling effective formation of a magnetic circuit and achieving high charging efficiency.

In the application of a wireless power transmission device to a charger for a power electronic device such as an electric vehicle, a large current needs to flow through a charging coil in order to meet the demand for high-power transmission. In the technique disclosed in Japanese Unexamined Patent Application Publication No. 01-23730, if a large current flows through the pair of charging coils on the coil yoke, on which magnetic poles are created vertically, not only the strength of a magnetic field contributing to power transmission but also the strength of an unwanted leakage magnetic field formed in a location away from the charging coils will increase, causing electromagnetic interference which might affect nearby electronic devices and so forth.

SUMMARY OF THE INVENTION

To address the above-described issue, an embodiment of the present invention provides a power feeding coil unit and a wireless power transmission device with high power transmission efficiency and a reduction in an unwanted leakage magnetic field formed in a location away from a power feeding coil.

According to an aspect of the present invention, a power feeding coil unit includes a first power feeding coil and a second power feeding coil that are apposed, generating a first magnetic flux, a first auxiliary coil on a rear side of the first power feeding coil, generating a second magnetic flux interlinking with the first power feeding coil, and a second auxiliary coil on a rear side of the second power feeding coil, generating a third magnetic flux interlinking with the second power feeding coil. The first magnetic flux interlinks with the first and second power feeding coils due to magnetic fields respectively generated by the first and second power feeding coils. An axial direction of the first auxiliary coil is nonparallel to an axial direction of the first power feeding coil, and an axial direction of the second auxiliary coil is nonparallel to an axial direction of the second power feeding coil. The direction of circulation of the second and third magnetic fluxes are opposite to a direction of circulation of the first magnetic flux.

According to the aspect, of the present invention, the first and second power feeding coils that are apposed generate a first magnetic flux interlinking with the first and second power feeding coils by using magnetic fields respectively generated by the first and second power feeding coils. As a result, the first and second power feeding coils enable efficient generation of a magnetic flux interlinking with the power receiving coil, achieving an improvement in power transmission efficiency.

The power feeding coil unit according to the aspect of the present invention includes a first auxiliary coil on a rear side of the first power feeding coil, generating a second magnetic flux interlinking with the first power feeding coil, and a second auxiliary coil on a rear side of the second power feeding coil, generating a third magnetic flux interlinking with the second power feeding coil. That is, the second magnetic flux generated by the first auxiliary coil enhances a magnetic field generated near the first power feeding coil, and the third magnetic flux generated by the second auxiliary coil enhances a magnetic field generated near the second power feeding coil. As a result, a portion of the first magnetic flux generated by the first and second power feeding coils, which contributes to power transmission, is not canceled by the second and third magnetic fluxes, enabling the maintenance of high power transmission efficiency. In the power feeding coil unit according to the aspect of the present invention, furthermore, the axial direction of the first auxiliary coil is nonparallel to the axial direction of the first power feeding coil, and the axial direction of the second auxiliary coil is nonparallel to the axial direction of the second power feeding coil. In addition, the direction of circulation of the second and third magnetic fluxes are opposite to the direction of circulation of the first magnetic flux. This allows the second and third magnetic fluxes generated by the first and second auxiliary coils to easily circulate also in a location away from the first and second power feeding coils. In addition, the second and third magnetic fluxes and the first magnetic flux, which circulate in opposite directions, cancel each other out in a location away from the first and second power feeding coils. Thus, an unwanted leakage magnetic field formed in a location away from the first and second power feeding coils may be reduced. Accordingly, high power transmission efficiency may be maintained with a reduction in an unwanted leakage magnetic field formed in a location away from the first and second power feeding coils.

Preferably, each of the first and second power feeding coils includes a magnetic core, and each of the first and second auxiliary coils includes a magnetic core. Preferably, the magnetic core of the first power feeding coil is coupled to the magnetic core of the first auxiliary coil, and the magnetic core of the second power feeding coil is coupled to the magnetic core of the second auxiliary coil. In this case, the first auxiliary coil easily generates a second magnetic flux that enhances a magnetic field generated near the first power feeding coil, and the second auxiliary coil easily generates a third magnetic flux that enhances a magnetic field generated near the second power feeding coil. As a result, a portion of the first magnetic flux generated by the first and second power feeding coils, which contributes to power transmission, is not canceled by the second and third magnetic fluxes, ensuring that high power transmission efficiency is maintained.

Preferably, the first auxiliary coil is arranged so that part or all thereof overlaps the first power feeding coil, and the second auxiliary coil is arranged so that part or all thereof overlaps the second power feeding coil. In this case, the first auxiliary coil and the first power feeding coil are arranged so as to be closer to each other, and the second auxiliary coil and the second power feeding coil are arranged so as to be closer to each other. Thus, the density distribution of the second and third magnetic fluxes generated by the first and second auxiliary coils in a location away from the first and second power feeding coils may be made closer to the density distribution of the first magnetic flux generated by the first and second power feeding coils. As a result, the effect of reducing an unwanted leakage magnetic field formed in a location away from the power feeding coil may further be enhanced.

Preferably, the axial direction of the first auxiliary coil is substantially perpendicular to the axial direction of the first power feeding coil, and the axial direction of the second auxiliary coil is substantially perpendicular to the axial direction of the second power feeding coil. In this case, the first and second auxiliary coils more easily generate second and third magnetic fluxes that circulate also in a location away from the first and second auxiliary coils. As a result, the effect of reducing an unwanted leakage magnetic field formed in a location away from the first and second power feeding coils may further be enhanced.

A wireless power transmission device according to another aspect of the present invention includes the power feeding coil unit described above, and a power receiving coil that is helical-shaped coil including a magnetic core and a wire wound around the magnetic core. According to the aspect of the present invention, it may be possible to provide a wireless power transmission device that maintains high power transmission efficiency while reducing an unwanted leakage magnetic field formed in a location away from the first and second power feeding coils.

According to some aspects of the present invention, therefore, it may be possible to provide a power feeding coil unit and a wireless power transmission device with high power transmission efficiency and a reduction in an unwanted leakage magnetic field formed in a location away from first and second power feeding coils.

BRIEF DESCRIPTION OF THE DRAWINGS

FIG. 3A is a diagram schematically illustrating the magnetic flux generated by first and second power feeding coils in FIG. 2.

FIG. 3B is a diagram schematically illustrating the magnetic flux generated by the first and second power feeding coils and first and second auxiliary coils in FIG. 2.

DESCRIPTION OF THE PREFERRED EMBODIMENTS

An embodiment of the present invention will foe described in detail with reference to the drawings. In the following description, substantially the same elements or elements having substantially the same function, are given the same numerals or signs, and are not described again.

Figure 1:
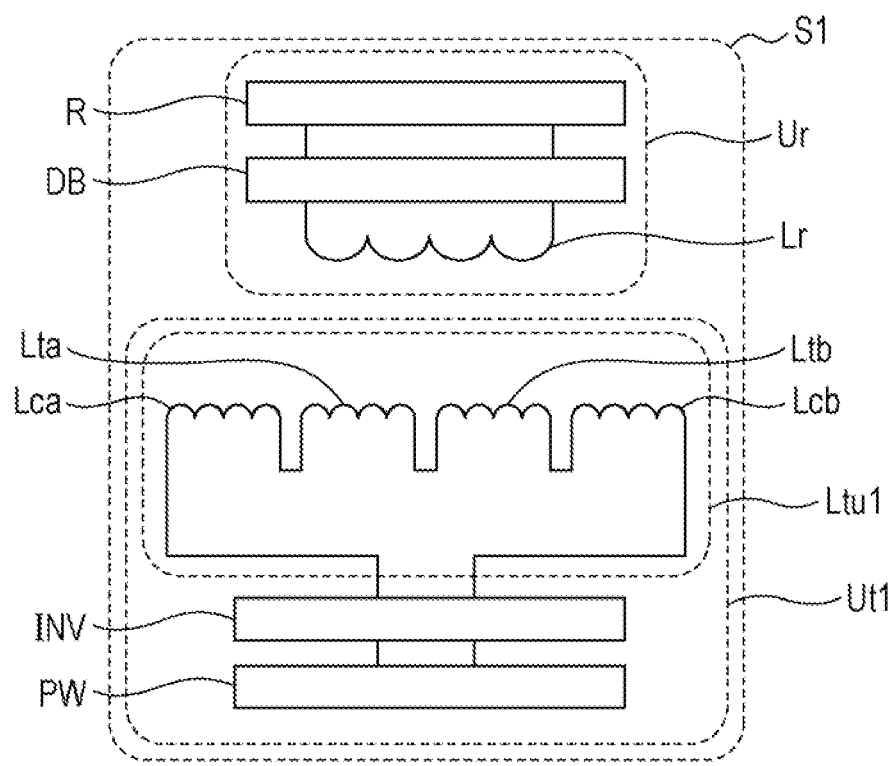
FIG. 1 is a system configuration diagram illustrating a wireless power transmission device according to a preferred embodiment of the present invention together with a load.
Figure 2:
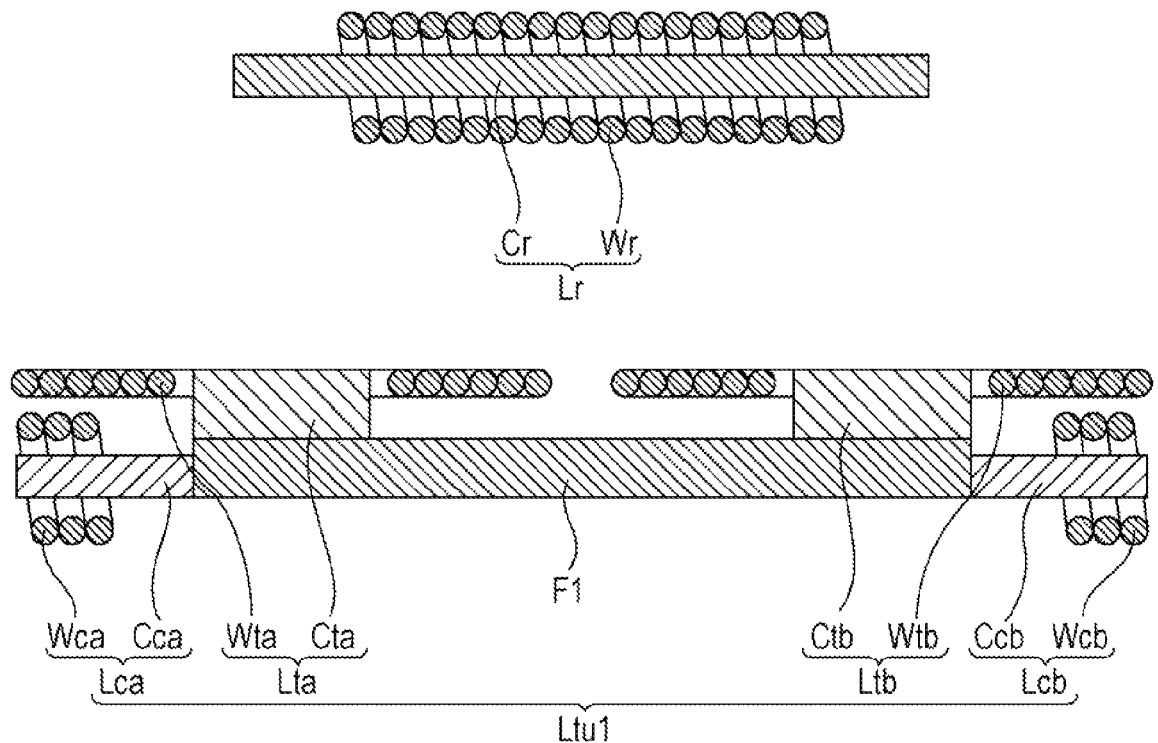
FIG. 2 is a cross-sectional view illustrating a power feeding coil unit according to the preferred embodiment of the present invention together with a power receiving coil.

First, a configuration of a wireless power transmission device S1 according to a preferred embodiment of the present invention will be described with reference to FIGS. 1 and 2. FIG. 1 is a system configuration diagram illustrating a wireless power transmission device according to the preferred embodiment of the present invention together with a load. FIG. 2 is a cross-sectional view illustrating a power feeding coil unit according to the preferred embodiment of the present invention together with a power receiving coil.

As illustrated in FIG. 1, the wireless power transmission device S1 includes a wireless power feeding device Ut1 and a wireless power receiving device Ur.

The wireless power feeding device Ut1 includes a power source PW, an inverter INV, and a power feeding coil unit Ltu1. The wireless power receiving device Ur includes a power receiving coil Lr and a rectifier circuit DB.

The power source PW supplies direct-current (DC) power to the inverter INV, described below. The power source PW is not limited to any particular one, and may be any power source that outputs DC power. Examples of such a power source may include a DC power source that is generated by rectifying and smoothing a commercial alternating-current (AC) power source, a secondary battery, a solar photovoltaic DC power source, and a switching power source device such as a switching converter.

The inverter INV has a function to convert input DC power supplied from the power source PW into AC power. In this embodiment, the inverter INV converts input DC power supplied from the power source PW into AC power, and supplies the AC power to the power feeding coil unit Ltu1 described below. The inverter INV may be implemented as a switching circuit having a plurality of switching elements bridge-connected. Examples of the switching elements of the switching circuit may include metal oxide semiconductor-field effect transistor (MOSFET) elements and insulated gate bipolar transistor (IGBT) elements.

The power feeding coil unit Ltu1 includes a first power feeding coil Lta, a second power feeding coil Ltb, a first auxiliary coil Lca, a second auxiliary coil Lcb, and a magnetic body F1. In this embodiment, as illustrated in FIG. 1, four coils, that is, the first and second power feeding coils Lta and Ltb and the first and second auxiliary coils Lca and Lcb, are electrically connected in series with one another. In a case where the wireless power transmission device S1 according to this embodiment is used for an electric power supply facility for a vehicle such as an electric vehicle, the power feeding coil unit Ltu1 will be installed in or on, or near, the ground.

The individual coils included in the power feeding coil unit Ltu1 will now be described with reference to FIG. 2. The first power feeding coil Lta includes a magnetic core Cta and a wire Wta. The first power feeding coil Lta is a planar-shaped spiral coil having a substantially rectangular shape, and is formed by winding the wire Wta, which is made of a Litz wire such as a copper wire or an aluminum wire, around the magnetic core Cta. The axial direction of the first power feeding coil Lta is parallel to the opposing direction of the first and second power feeding coils Lta and Ltb and the power receiving coil Lr described below. The number of turns of the first power feeding coil Lta is appropriately set on the basis of the separation distance between the first power feeding coil Lta and the power receiving coil Lr described below, the desired power transmission efficiency, and so forth.

The second power feeding coil Ltb includes a magnetic core Ctb and a wire Wtb. The second power feeding coil Ltb is a planar-shaped spiral coil having a substantially rectangular shape, and is formed by winding the wire Wtb, which is made of a Litz wire such as a copper wire or an aluminum wire, around the magnetic core Ctb. The axial direction of the second power feeding coil Ltb is parallel to the opposing direction of the first and second power feeding coils Lta and Ltb and the power receiving coil Lr described below. The second power feeding coil Ltb is apposed in the same plane as the first power feeding coil Lta, and the arrangement interval between the first and second power feeding coils Lta and Ltb and the number of turns of the second power feeding coil Ltb are appropriately set on the basis of the separation distance between the second power feeding coil Ltb and the power receiving coil Lr described below, the desired power transmission efficiency, and so forth. The first and second power feeding coils Lta and Ltb have a function to wirelessly feed the AC power supplied from the inverter INV to the power receiving coil Lr described below.

The first power feeding coil Lta and the second power feeding coil Ltb are configured such that a magnetic path interlinking the power feeding coils Lta and Ltb is formed by magnetic fields respectively generated by the power feeding coils Lta and Ltb. In this case, the power feeding coils Lta and Ltb efficiently generate a magnetic flux that interlinks with the power receiving coil Lr described below. Thus, power transmission efficiency may be improved. Specifically, the first power feeding coil Lta and the second power feeding coil Ltb generate a first magnetic flux that circulates so as to interlink the power feeding coils Lta and Ltb. The first magnetic flux that circulates through the power feeding coils Lta and Ltb interlinks with the first power feeding coil Lta and interlinks with the second power feeding coil Ltb in opposite directions. In order to form the magnetic path interlinking the power feeding coils Lta and Ltb, it may be sufficient to electrically connect the first power feeding coil Lta and the second power feeding coil Ltb to each other so that the direction of the magnetic field generated by the first power feeding coil Lta and the direction of the magnetic field generated by the second power feeding coil Ltb are opposite to each other. In a case where the first power feeding coil Lta and the second power feeding coil Ltb are wound in the same direction, it may be sufficient to connect the first power feeding coil Lta and the second power feeding coil Ltb so that the direction of the current flowing in the first power feeding coil Lta and the direction of the current flowing in the second power feeding coil Ltb are opposite to each other. Alternatively, in a case where the first power feeding coil Lta and the second power feeding coil Ltb are wound in opposite directions, it may be sufficient to connect the first power feeding coil Lta and the second power feeding coil Ltb so that the direction of the current flowing in the first power feeding coil Lta and the direction of the current flowing in the second power feeding coil Ltb are the same.

The first auxiliary coil Lca includes a magnetic core Cca and a wire Wca. The first auxiliary coil Lca is a solenoid coil wound in a helical shape, and is formed by winding the wire Wca, which is made of a Litz wire such as a copper wire or an aluminum wire, around the magnetic core Cca, which is shaped into a plate or a bar. The first auxiliary coil Lca generates a second magnetic flux. The axial direction of the first auxiliary coil Lca is nonparallel to the axial direction of the first power feeding coil Lta. The configuration described above allows the second magnetic flux generated by the first auxiliary coil Lca to easily circulate also in a location away from the first auxiliary coil Lca without interlinking with the power receiving coil Lr described below. In this embodiment, the axial direction of the first auxiliary coil Lca is perpendicular to the axial direction of the first power feeding coil Lta. In this case, the first auxiliary coil Lca more facilitates the generation of the second magnetic flux that circulates also in a location away from the first auxiliary coil Lca.

In addition, the first auxiliary coil Lca is arranged on the rear side of the first power feeding coil Lta. That is, the first auxiliary coil Lca is arranged on the opposite to the side of the first and second power feeding coils Lta and Ltb facing the power receiving coil Lr described below. More specifically, the first auxiliary coil Lca is arranged so as to overlap the first power feeding coil Lta when viewed from the opposing direction of the first and second power feeding coils Lta and Ltb and the power receiving coil Lr described below. The arrangement described above allows the first auxiliary coil Lca to easily generate the second magnetic flux that enhances a magnetic field generated between the first power feeding coil Lta and the power receiving coil Lr described below. That is, the first magnetic flux interlinking with the first power feeding coil Lta and the second magnetic flux generated by the first auxiliary coil Lca are oriented in substantially the same direction between the first power feeding coil Lta and the power receiving coil Lr described below. Accordingly, the magnetic flux interlinking both the first power feeding coil Lta and the power receiving coil Lr described below, which contributes to power transmission, is not canceled by the second magnetic flux generated by the first auxiliary coil Lca. As a result, a reduction in power transmission efficiency may further be prevented or minimized. In addition, the first auxiliary coil Lca and the first power feeding coil Lta are arranged so as to be closer to each other. Thus, the density distribution of the second magnetic flux generated by the first auxiliary coil Lca in a location away from the first power feeding coil Lta may be made closer to the density distribution of the first magnetic flux generated by the first and second power feeding coils Lta and Ltb.

Furthermore, the direction of circulation of the second magnetic flux generated by the first auxiliary coil Lca is opposite to the direction of circulation of the first magnetic flux generated by the first and second power feeding coils Lta and Ltb. Specifically, in FIG. 2, when the first magnetic flux generated by the first and second power feeding coils Lta and Ltb interlinks the first power feeding coil Lta in the direction from the first power feeding coil Lta to the power receiving coil Lr described below (i.e., vertically upward in FIG. 2) and interlinks the second power feeding coil Ltb in the direction from the power receiving coil Lr described below to the second power feeding coil Ltb (i.e., vertically downward in FIG. 2), the first auxiliary coil Lca generates a magnetic flux interlinking in the direction from the first auxiliary coil Lca to a center portion of the first power feeding coil Lta (i.e., horizontally rightward in FIG. 2), thereby making the direction of circulation of the second magnetic flux generated by the first auxiliary coil Lca opposite to the direction of circulation of the first magnetic flux generated by the first and second power feeding coils Lta and Ltb. Alternatively, in FIG. 2, when the first magnetic flux generated by the first and second power feeding coils Lta and Ltb interlinks the first power feeding coil Lta in the direction from the power receiving coil Lr described below to the first power feeding coil Lta (i.e., vertically downward in FIG. 2), and interlinks the second power feeding coil Ltb in the direction from the second power feeding coil Ltb to the power receiving coil Lr described below (i.e., vertically upward in FIG. 2), the first auxiliary coil Lca generates a magnetic flux interlinking in the direction from the center portion of the first power feeding coil Lta to the first auxiliary coil Lca (i.e., horizontally leftward in FIG. 2), thereby making the direction of circulation of the second magnetic flux generated by the first auxiliary coil Lca opposite to the direction of circulation of the first magnetic flux generated by the first and second power feeding coils Lta and Ltb. In order to generate the second magnetic flux described above, it may be sufficient to wind the wire Wca of the first auxiliary coil Lca around the magnetic core Cca so that the direction of the current flowing through a portion of the wire Wca of the first auxiliary coil Lca in closest proximity to the wire Wta of the first power feeding coil Lta (i.e., the upper portion of the wire Wca of the first auxiliary coil Lca in FIG. 2) is the same as the direction of the current flowing through a portion of the wire Wta of the first power feeding coil Lta in closest proximity to the wire Wca of the first auxiliary coil Lca (i.e., the left-hand portion of the wire Wta of the first power feeding coil Lta in FIG. 2). With the configuration described above, in locations away from the first and second power feeding coils Lta and Ltb and the first auxiliary coil Lca, which are magnetic flux generators, the first magnetic flux generated by the first and second power feeding coils Lta and Ltb and the second magnetic flux generated by the first auxiliary coil Lca are oriented in opposite directions, allowing the first magnetic flux generated by the first and second power feeding coils Lta and Ltb and the second magnetic flux generated by the first auxiliary coil Lca to be canceled by each other. The strength of a magnetic field formed in a location away from the first and second power feeding coils Lta and Ltb is reduced. Accordingly, a reduction in the unwanted leakage magnetic field formed in a location away from the first and second power feeding coils Lta and Ltb may be achieved.

The second auxiliary coil Lcb includes a magnetic core Ccb and a wire Wcb. The second auxiliary coil Lcb is a solenoid coil wound in a helical shape, and is formed by winding the wire Wcb, which is made of a Litz wire such as a copper wire or an aluminum wire, around the magnetic core Ccb, which is shaped into a plate or a bar. The second auxiliary coil Lcb generates a third magnetic flux. The axial direction of the second auxiliary coil Lcb is nonparallel to the axial direction of the second power feeding coil Ltb. The configuration described above allows the third magnetic flux generated by the second auxiliary coil Lcb to easily circulate also in a location away from the second auxiliary coil Lcb without interlinking with the power receiving coil Lr described below. In this embodiment, the axial direction of the second auxiliary coil Lcb is perpendicular to the axial direction of the second power feeding coil Ltb. In this case, the second auxiliary coil Lcb more facilitates the generation of the third magnetic flux that circulates also in a location away from the second auxiliary coil Lcb.

In addition, the second auxiliary coil Lcb is arranged on the rear side of the second power feeding coil Ltb. That is, the second auxiliary coil Lcb is arranged on the opposite to the side of the first and second power feeding coils Lta and Ltb facing the power receiving coil Lr described below. More specifically, the second auxiliary coil Lcb is arranged so as to overlap the second power feeding coil Ltb when viewed from the opposing direction of the first and second power feeding coils Lta and Ltb and the power receiving coil Lr described below. The arrangement described above allows the second auxiliary coil Lcb to easily generate the third magnetic flux that enhances a magnetic field generated between the second power feeding coil Ltb and the power receiving coil Lr described below. That is, the first magnetic flux interlinking with the second power feeding coil Ltb and the third magnetic flux generated by the second auxiliary coil Lcb are oriented in substantially the same direction between the second power feeding coil Ltb and the power receiving coil Lr described below. Accordingly, the magnetic flux interlinking both the second power feeding coil Ltb and the power receiving coil Lr described below, which contributes to power transmission, is not canceled by the third magnetic flux generated by the second auxiliary coil Lcb. As a result, a reduction in power transmission efficiency may further be prevented or minimized. In addition, the second auxiliary coil Lcb and the second power feeding coil Ltb are arranged so as to be closer to each other. Thus, the density distribution of the third magnetic flux generated by the second auxiliary coil Lcb in a location away from the second power feeding coil Ltb may be made closer to the density distribution of the first magnetic flux generated by the first and second power feeding coils Lta and Ltb.

Furthermore, the direction of circulation of the third magnetic flux generated by the second auxiliary coil Lcb is opposite to the direction of circulation of the first magnetic flux generated by the first and second power feeding coils Lta and Ltb. Specifically, in FIG. 2, when the first magnetic flux generated by the first and second power feeding coils Lta and Ltb interlinks the first power feeding coil Lta in the direction from the first power feeding coil Lta to the power receiving coil Lr described below (i.e., vertically upward in FIG. 2), and interlinks the second power feeding coil Ltb in the direction from the power receiving coil Lr described below to the second power feeding coil Ltb (i.e., vertically downward in FIG. 2), the second auxiliary coil Lcb generates a magnetic flux interlinking in the direction from a center portion of the second power feeding coil Ltb to the second auxiliary coil Lcb (i.e., horizontally rightward in FIG. 2), thereby making the direction of circulation of the third magnetic flux generated by the second auxiliary coil Lcb opposite to the direction of circulation of the first magnetic flux generated by the first and second power feeding coils Lta and Ltb. Alternatively, in FIG. 2, when the first magnetic flux generated by the first and second power feeding coils Lta and Ltb interlinks the first power feeding coil Lta in the direction from the power receiving coil Lr described below to the first power feeding coil Lta (i.e., vertically downward in FIG. 2), and interlinks the second power feeding coil Ltb in the direction from the second power feeding coil Ltb to the power receiving coil Lr described below (i.e., vertically upward in FIG. 2), the second, auxiliary coil Lcb generates a magnetic flux interlinking in the direction from the second auxiliary coil Lcb to the center portion of the second power feeding coil Ltb (i.e., horizontally leftward in FIG. 2), thereby making the direction of circulation, of the third magnetic flux generated by the second auxiliary coil Lcb opposite to the direction of circulation of the first magnetic flux generated by the first and second power feeding coils Lta and Ltb. In order to generate the third magnetic flux described above, it may be sufficient to wind the wire Wcb of the second auxiliary coil Lcb around the magnetic core Ccb so that the direction of the current flowing through a portion of the wire Wcb of the second auxiliary coil Lcb in closest proximity to the wire Wtb of the second power feeding coil Ltb (i.e., the upper portion of the wire Wcb of the second auxiliary coil Lcb in FIG. 2) is the same as the direction of the current flowing through a portion of the wire Wtb of the second power feeding coil Ltb in most proximity to the wire Wcb of the second auxiliary coil Lcb (i.e., the right-hand portion of the wire Wtb of the second power feeding coil Ltb in FIG. 2). With the configuration described above, in locations away from the first and second power feeding coils Lta and Ltb and the second auxiliary coil Lcb, which are magnetic flux generators, the first magnetic flux generated by the first and second power feeding coils Lta and Ltb and the third magnetic flux generated by the second auxiliary coil Lcb are oriented in opposite directions, allowing the first magnetic flux generated by the first and second power feeding coils Lta and Ltb and the third magnetic flux generated by the second auxiliary coil Lcb to be canceled by each other. The strength of a magnetic field formed in a location away from the first and second power feeding coils Lta and Ltb is reduced. Accordingly, a reduction in the unwanted leakage magnetic field formed in a location away from the first and second power feeding coils Lta and Ltb may be achieved.

The first auxiliary coil Lca and the second auxiliary coil Lcb are arranged so that the center portion of the first power feeding coil Lta and the center portion of the second power feeding coil Ltb are located between a center portion of the first auxiliary coil Lca and a center portion of the second auxiliary coil Lcb. Specifically, the first auxiliary coil Lca and the second auxiliary coil Lcb are arranged so that the center portion of the first auxiliary coil Lca and the center portion of the second auxiliary coil Lcb are located on both outer sides of the first and second power feeding coils Lta and Ltb, in the direction of alignment of the first and second power feeding coils Lta and Ltb. The arrangement described above allows the second magnetic flux generated by the first auxiliary coil Lca to also interlink with the first power feeding coil Lta, and allows the third magnetic flux generated by the second auxiliary coil Lcb to also interlink with the second power feeding coil Ltb. In this case, since the first and second auxiliary coils Lca and Lcb are arranged on both outer sides of the first and second power feeding coils Lta and Ltb, a further reduction in an unwanted leakage magnetic field formed in a location away from the first and second power feeding coils Lta and Ltb may be achieved.

The magnetic body F1 extends along a surface on the opposite to the side of the first, and second power feeding coils Lta and Ltb facing the power receiving coil Lr described below. In this embodiment, as illustrated in FIG. 2, the magnetic body F1 is connected to each of the magnetic core Cta of the first power feeding coil Lta and the magnetic core Ctb of the second power feeding coil Ltb near either end of the surface on a side of the magnetic body F1 closer to the power receiving coil Lr described below (i.e., the upper surface in FIG. 2) in the opposing direction of the first and second power feeding coils Lta and Ltb and the power receiving coil Lr described below. As illustrated in FIG. 2, the magnetic body F1 is further connected to each of the magnetic core Cca of the first auxiliary coil Lca and the magnetic core Ccb of the second auxiliary coil Lcb on either side surface (i.e., the left and right side surfaces in FIG. 2) of the magnetic body F1 in the direction of alignment of the first and second power feeding coils Lta and Ltb. The configuration described above allows the magnetic core Cca of the first auxiliary coil Lca and the magnetic core Ccb of the second auxiliary coil Lcb to be coupled to the magnetic core Cta of the first power feeding coil Lta and the magnetic core Ctb of the second power feeding coil Ltb, respectively, via the magnetic body F1. Thus, the first auxiliary coil Lca easily generates the second magnetic flux that enhances a magnetic field between the first power feeding coil Lta and the power receiving coil Lr described below, and the second auxiliary coil Lcb easily generates the third magnetic flux that enhances a magnetic field between the second power feeding coil Ltb and the power receiving coil Lr described below. That is, the first magnetic flux interlinking with the first power feeding coil Lta and the second magnetic flux generated by the first auxiliary coil Lca are oriented in substantially the same direction between the first power feeding coil Lta and the power receiving coil Lr described below, and the first magnetic flux interlinking with the second power feeding coil Ltb and the third magnetic flux generated by the second auxiliary coil Lcb are oriented in substantially the same direction between the second power feeding coil Ltb and the power receiving coil Lr described below. Accordingly, the magnetic flux interlinking ail of the first and second power feeding coils Lta and Ltb and the power receiving coil Lr described below, which contributes to power transmission, is not canceled by the second and third magnetic fluxes generated by the first and second auxiliary coils Lca and Lcb. As a result, a reduction in power transmission efficiency may further be prevented or minimized.

Next, the configuration of the wireless power receiving device Ur will be described. As illustrated in FIG. 2, the power receiving coil Lr includes a magnetic core Cr and a wire Wr. The power receiving coil Lr is a solenoid coil wound in a helical shape, and is formed by winding the wire Wr around the magnetic core Cr, which is shaped into a plate or a bar. The power receiving coil Lr has a function to receive the AC power fed from the first and second power feeding coils Lta and Ltb of the power feeding coil unit Ltu1. In a case where the wireless power transmission device S1 according to this embodiment is used for an electric power supply facility for a vehicle such as an electric vehicle, the power receiving coil Lr will be mounted on the bottom of the vehicle.

The rectifier circuit DB has a function to rectify the AC power received by the power receiving coil Lr to DC power. Examples of the rectifier circuit DB may include a converter circuit having a full-wave rectifying function that uses a diode bridge and a power smoothing function that uses a capacitor and a three-terminal regulator. The DC power obtained by rectification by the rectifier circuit DB is output to a load R. Examples of the load R may include, in a case where the wireless power transmission device S1 according to this embodiment is used for an electric power supply facility for a vehicle such as an electric vehicle, a secondary battery and a rotating machine that are included in the vehicle. In a case where the load R is an AC rotating machine, the wireless power receiving device Or will require an additional inverter (not illustrated) between the rectifier circuit DB and the load R to supply AC power to the AC rotating machine.

The relative relationship between the magnetic flux generated by a power feeding coil and the magnetic flux generated by an auxiliary coil and the effect of reducing the unwanted leakage magnetic field in this embodiment will now be described in detail with reference to FIGS. 3A and 3B. FIG. 3A is a diagram schematically illustrating the magnetic flux generated by the first and second power feeding coils Lta and Ltb in FIG. 2. In FIG. 3A, magnetic fluxes Bt1$a$ to Bt1$d$ are illustrated as typical magnetic fluxes generated by the first and second power feeding coils Lta and Ltb. In FIG. 3B, magnetic fluxes Bt1$a$ to Bt1$d$ are illustrated as typical magnetic fluxes generated by the first and second power feeding coils Lta and Ltb, and magnetic fluxes Bc1$a$ to Bc1$d$ are schematically illustrated, as typical magnetic fluxes generated by the first and second auxiliary coils Lca and Lcb. Note that the illustrated magnetic fluxes schematically depict only the orientations of the individual magnetic fluxes, and do not depict the magnetic flux densities. In FIG. 3A and FIG. 3B, the magnetic flux in the magnetic cores Cta and Ctb of the first and second power feeding coils Lta and Ltb, the magnetic cores Cca and Ccb of the first, and second auxiliary coils Lca and Lcb, the magnetic body F1, and the magnetic core Cr of the power receiving coil Lr is not illustrated.

First, the magnetic flux generated by the first and second power feeding coils Lta and Ltb will be described with reference to FIG. 3A. As illustrated in FIG. 3A, the first and second power feeding ceils Lta and Ltb generate the first magnetic fluxes Bt1$a$ to Bt1$d$ that interlink the first power feeding coil Lta in the direction from the first power feeding coil Lta to the power receiving coil Lr (i.e., vertically upward in FIG. 3A) and that interlink the second power feeding coil Ltb in the direction from the power receiving coil Lr to the second power feeding coil Ltb (i.e., vertically downward in FIG. 3A). That is, the first and second power feeding coils Lta and Ltb generate the first magnetic fluxes Bt1$a$ to Bt1$d$ that circulate in the same direction. In the illustrated example, the first magnetic fluxes Bt1$a$ to Bt1$d$ generated by the first and second power feeding coils Lta and Ltb include magnetic fluxes Bt1$a$ and Bt1$b$ that interlink with the power receiving coil Lr and that contribute to power transmission, and magnetic fluxes Bt1$c$ and Bt1$a$ that circulate in a location away from the first and second power feeding coils Lta and Ltb without interlinking with the power receiving coil Lr. The interlinking of the magnetic fluxes Bt1$a$ and Bt1$b$ with the power receiving coil Lr induces an electromotive force in the wire Wr of the power receiving coil Lr. The power generated in the power receiving coil Lr is rectified by the rectifier circuit DB, and is output to the load R. In this embodiment, a magnetic path interlinking the power feeding coils Lta and Ltb is formed by magnetic fields respectively generated by the first power feeding coil Lta and the second power feeding coil Ltb, enabling efficient generation of the magnetic fluxes Bt1$a$ and Bt1$b$. Thus, the magnetic flux density of the magnetic fluxes Bt1$a$ and Bt1$b$ that circulate in the vicinity of the first and second power feeding coils Lta and Ltb is significantly higher than that of the magnetic fluxes Bt1$c$ and Bt1$d$ that largely circulate also in a location away from the first and second power feeding coils Lta and Ltb. That is, a large generation of the magnetic flux generated by the first and second power feeding coils Lta and Ltb interlinks with the power receiving coil Lr. As a result, the coupling between the first and second power feeding coils Lta and Ltb and the power receiving coil Lr is high, and the power transmission efficiency is also high. The first magnetic fluxes Bt1$a$ to Bt1$d$ generated by the first and second power feeding coils Lta and Ltb do not interlink with the first and second auxiliary coils Lca and Lcb, and the magnetic fluxes Bt1$a$ and Bt1$b$, which contribute to power transmission, are not canceled out using the first and second auxiliary coils Lca and Lcb. Thus, a reduction in power transmission efficiency may be prevented or minimized.

The magnetic flux generated by the first and second auxiliary coils Lca and Lcb will now be described with reference to FIG. 3B. The magnetic fluxes Bt1$a$ to Bt1$d$ generated by the first and second power feeding coils Lta and Ltb in FIG. 3B are as illustrated in FIG. 3A. As illustrated in FIG. 3B, the first auxiliary coil Lca generates second magnetic fluxes Bc1$a$ and Bc1$b$ that interlink the first auxiliary coil Lca in the direction from the first auxiliary coil Lca to a center portion of the first power feeding coil Lta (i.e., horizontally rightward in FIG. 3B) and that interlink the first power feeding coil Lta in the direction from the first power feeding coil Lta to the power receiving coil Lr (i.e., vertically upward in FIG. 3B). Specifically, in this embodiment, since the axial direction of the first auxiliary coil Lca is nonparallel to the opposing direction of the first and second power feeding coils Lta and Ltb and the power receiving coil Lr, the second magnetic fluxes Bc1$a$ and Bc1$b$ generated by the first auxiliary coil Lca circulate in a location away from the first auxiliary coil Lca without interlinking with the power receiving coil Lr. In particular, in this embodiment, since the axial direction of the first auxiliary coil Lca is perpendicular to the opposing direction of the first and second power feeding coils Lta and Ltb and the power receiving coil Lr, the second magnetic fluxes Bc1$a$ and Bc1$b$ generated by the first auxiliary coil Lca largely circulate also in a location away from the first auxiliary coil Lca. In addition, the first auxiliary coil Lca is arranged on the opposite to the side of the first and second power feeding coils Lta and Ltb facing the power receiving coil Lr. Thus, the second magnetic fluxes Bc1$a$ and Bc1$b$ generated by the first auxiliary coil Lca interlink with the first power feeding coil Lta.

Likewise, as illustrated in FIG. 3B, the second auxiliary coil Lcb generates third magnetic fluxes Bc1$c$ and Bc1$d$ that interlink the second auxiliary coil Lcb in the direction from the second power feeding coil Ltb to the second auxiliary coil Lcb (i.e., horizontally rightward in FIG. 3B) and that interlink the second power feeding coil Ltd in the direction from the power receiving coil Lr to the second power feeding coil Ltb (i.e., vertically downward in FIG. 3B). Specifically, in this embodiment, since the axial direction of the second auxiliary coil Lcb is nonparallel to the opposing direction of the first and second power feeding coils Lta and Ltb and the power receiving coil Lr, the third magnetic fluxes Bc1$c$ and Bc1$d$ generated by the second auxiliary coil Lcb circulate in a location away from the second auxiliary coil Lcb without interlinking with the power receiving coil Lr. In particular, in this embodiment, since the axial direction of the second auxiliary coil Lcb is perpendicular to the opposing direction of the first and second power feeding coils Lta and Ltb and the power receiving coil Lr, the third magnetic fluxes Bc1$c$ and Bc1$d$ generated by the second auxiliary coil Lcb largely circulate also in a location away from the second auxiliary coil Lcb. In addition, the second auxiliary coil Lcb is arranged on the opposite to the side of the first and second power feeding coils Lta and Ltb facing the power receiving coil Lr. Thus, the third magnetic fluxes Bc1$c$ and Bc1$d$ generated by the second auxiliary coil Lcb interlink with the second power feeding coil Ltb.

Next, the effect of reducing the unwanted leakage magnetic field in this embodiment will be described. As described above, the first and second power feeding coils Lta and Ltb generate the magnetic fluxes Bt1$c$ and Bt1$d$ that circulate in a location away from the first and second power feeding coils Lta and Ltb. The magnetic fluxes Bt1c and Bt1d do not contribute to power transmission because of not interlinking with the power receiving coil Lr, and become magnetic fluxes that form an unwanted leakage magnetic field around the first and second power feeding coils Lta and Ltb, although the magnetic fluxes Bt1c and Bt1d have a significantly lower magnetic flux density than the magnetic fluxes Bt1a and Bt1b that circulate in the vicinity of the first and second power feeding coils Lta and Ltb. In this embodiment, the direction of circulation of the second magnetic fluxes Bc1a and Bc1b generated by the first auxiliary coil Lca and the direction of circulation of the third magnetic fluxes Bc1c and Bc1d generated by the second auxiliary coil Lcb are opposite to the direction of circulation of the first magnetic fluxes Bt1a to Bt1d generated by the first and second power feeding coils Lta and Ltb. Accordingly, as illustrated in FIG. 3B, the magnetic fluxes Bt1c and Bt1d generated by the first and second power feeding coils Lta and Ltb and the second and third magnetic fluxes Bc1a to Bc1d generated by the first and second auxiliary coils Lca and Lcb are oriented in opposite directions in a location away from the first and second power feeding coils Lta and Ltb. That is, the magnetic fluxes Bt1c and Bt1d generated by the first and second power feeding coils Lta and Ltb are canceled by the second and third magnetic fluxes Bc1a to Bc1d generated by the first and second auxiliary coils Lca and Lcb in a location away from the first and second power feeding coils Lta and Ltb. Here, a magnetic field is represented by a magnetic flux density. Due to the cancellation of the magnetic fluxes Bt1c and Bt1d generated by the first and second power feeding coils Lta and Ltb, which form the unwanted leakage magnetic field, the magnetic flux density of the magnetic fluxes Bt1c and Bt1d decreases. As a result, the unwanted leakage magnetic field may be reduced.

On the other hand, the first magnetic fluxes Bt1a and Bt1b generated by the first and second power feeding coils Lta and Ltb and the second magnetic flexes Bc1a and Bc1b generated by the first auxiliary coil Lca are oriented in substantially the same direction in the vicinity of the first power feeding coil Lta. That is, the magnetic field generated by the first auxiliary coil Lca enhances a part of the magnetic field between the first power feeding coil Lta and the power receiving coil Lr. In this manner, the first magnetic fluxes Bt1a and Bt1b generated by the first and second power feeding coils Lta and Ltb and the second magnetic fluxes Bc1a and Bc1b generated by the first auxiliary coil Lca are oriented in substantially the same direction between the first power feeding coil Lta and the power receiving coil Lr. Accordingly, the magnetic fluxes Bt1a and Bt1b interlinking both the first power feeding coil Lta and the power receiving coil Lr, which contribute to power transmission, are not canceled by the second magnetic fluxes Bc1a and Bc1b generated by the first auxiliary coil Lca. As a result, a reduction in power transmission efficiency may be prevented or minimized. Similarly, the first magnetic fluxes Bt1a and Bt1b generated by the first and second power feeding coils Lta and Ltb and the third magnetic fluxes Bc1c and Bc1d generated by the second auxiliary coil Lcb are oriented in substantially the same direction in the vicinity of the second power feeding coil Ltb. That is, the magnetic field generated by the second auxiliary coil Lcb enhances a part of the magnetic field between the second power feeding coil Ltb and the power receiving coil Lr. In this manner, the first magnetic fluxes Bt1a and Bt1b generated by the first and second power feeding coils Lta and Ltb and the third magnetic fluxes Bc1c and Bc1d generated by the second auxiliary coil Lcb are oriented in substantially the same direction between the second power feeding coil Ltb and the power receiving coil Lr. Accordingly, the magnetic fluxes Bt1a and Bt1b interlinking both the second power feeding coil Ltb and the power receiving coil Lr, which contribute to power transmission, are not canceled by the third magnetic fluxes Bc1c and Bc1d generated by the second auxiliary coil Lcb. As a result, high power transmission may be maintained.

In this manner, the second and third magnetic fluxes Bc1a to Bc1d generated by the first and second auxiliary coils Lca and Lcb do not cancel the magnetic fluxes Bt1a and Bt1d that is generated by the first and second power feeding coil Lta and Ltb and are interlinking with the power receiving coil Lr, and the magnetic flux Bc1a to Bc1d generated by the first and second auxiliary coil Lca and Lcb cancel the magnetic flux Bt1c and Bt1d that is generated by the first and second power feeding coil Lta and Ltb and is not interlinking with the power receiving coil Lr. This may prevent or minimize a reduction in power transmission efficiency while reducing an unwanted leakage magnetic field formed in a location away from the first and second power feeding coils Lta and Ltb.

In the manner described above, in the power feeding coil unit Ltd according to this embodiment, the first and second power feeding coils Lta and Ltb that are apposed generate the first magnetic fluxes Bt1a to Bt1d that interlink the first and second power feeding coils Lta and Ltb by using magnetic fields respectively generated by the first and second power feeding coils Lta and Ltb. As a result, the power feeding coils Lta and Ltb efficiently generate the magnetic fluxes Bt1a and Bt1b, which interlink with the power receiving coil Lr. Thus, power transmission efficiency may be improved.

In addition, the power feeding coil unit Ltu1 according to this embodiment includes the first auxiliary coil Lca on the rear side of the first power feeding coil Lta, generating the second magnetic fluxes Bc1a and Bc1b interlinking with the first power feeding coil Lta, and the second auxiliary coil Lcb on the rear side of the second power feeding coil Ltb, generating the third magnetic fluxes Bc1c and Bc1d interlinking with the second power feeding coil Ltb. That is, the second magnetic fluxes Bc1a and Bc1b generated by the first auxiliary coil Lca enhance a magnetic field generated near the first power feeding coil Lta, and the third magnetic fluxes Bc1c and Bc1d generated by the second auxiliary coil Lcb enhance a magnetic field generated near the second power feeding coil Ltb. As a result, the magnetic fluxes Bt1a and Bt1b contributing to power transmission are not canceled by the second and third magnetic fluxes Bc1a to Bc1d. Thus, high power transmission efficiency may be maintained. Furthermore, the axial direction of the first auxiliary coil Lca is nonparallel to the axial direction of the first power feeding coil Lta, and the axial direction of the second auxiliary coil Lcb is nonparallel to the axial direction of the second power feeding coil Ltb. In addition, the direction of circulation of the second and third magnetic fluxes Bc1a to Bc1d is opposite to the direction of circulation of the first magnetic fluxes Bt1a to Bt1d. As a result, the second and third magnetic fluxes Bc1a to Bc1d generated by the first and second auxiliary coils Lca and Lcb easily circulate also in a location away from the first and second power feeding coils Lta and Ltb. In addition, the second and third magnetic fluxes Bc1a to Bc1 and the magnetic fluxes Bt1c and Bt1d that causes an unwanted leakage magnetic field, which circulate in opposite directions, cancel each other out in a location away from the first and second power feeding coils Lta and Ltb. Thus, a reduction in the unwanted leakage magnetic field formed in a location away from the first and second power feeding coils Lta and Ltb may be achieved. Accordingly, high power transmission efficiency may be maintained with a reduction in an unwanted leakage magnetic field formed in a location away from the first and second power feeding coils Lta and Ltb.

Hereinafter, advantages achievable with this embodiment, which prevent or minimize a reduction in power transmission efficiency while reducing an unwanted leakage magnetic field formed in a location away from a power feeding coil, will be specifically described with reference to Example and Comparative Example.

In Example, the wireless power transmission device S1 according to the preferred embodiment described above was used. In Comparative Example, for comparison with Example in terms of characteristics, a wireless power transmission device configured such that the wireless power transmission device S1 according to the preferred embodiment does not include an auxiliary coil was used.

Figure 4:
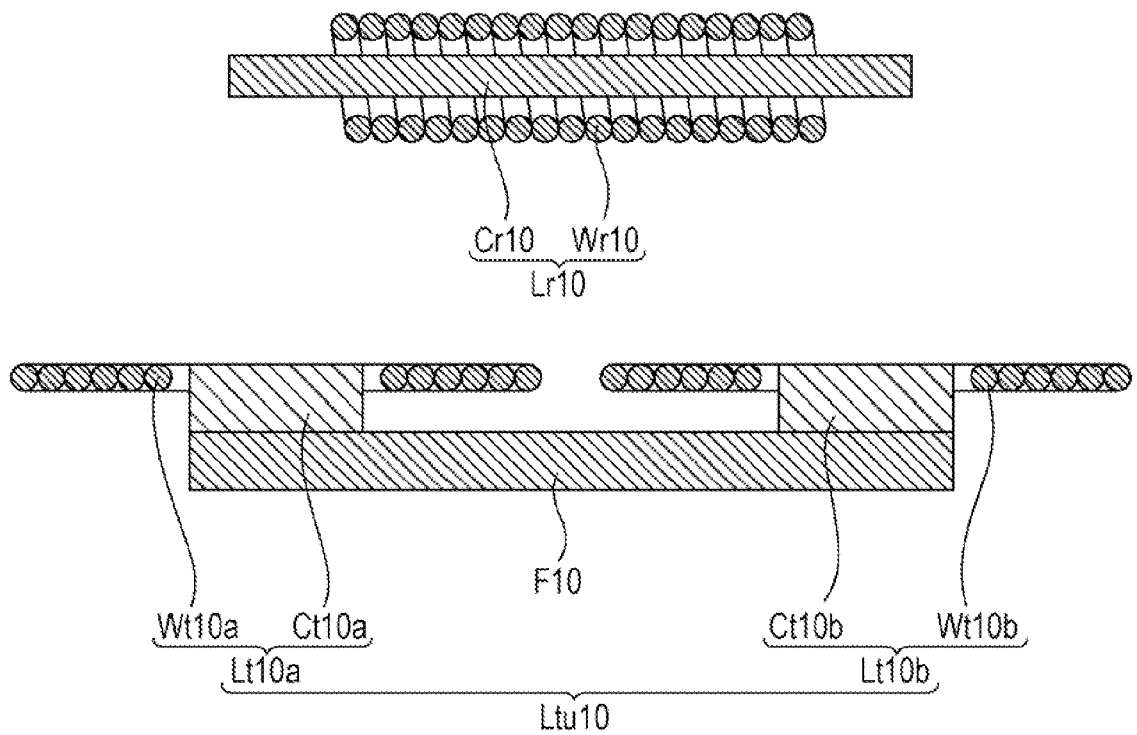
FIG. 4 is a cross-sectional view illustrating a power feeding coil unit in Comparative Example together with a power receiving coil.

First, the configuration of a power feeding coil unit Ltu10 and a power receiving coil Lr10 in the wireless power transmission device in Comparative Example will be described with reference to FIG. 4. FIG. 4 is a cross-sectional view illustrating the power feeding coil unit in Comparative Example together with a power receiving coil. The power feeding coil unit Ltu10 includes a magnetic body F10 and first and second power feeding coils Lt10a and Lt10b. Each of the first and second power feeding coils Lt10a and Lt10b is a planar-shaped spiral coil having a substantially rectangular shape. The first power feeding coil Lt10a is formed by winding a wire Wt10a around a magnetic core Ct10a, and the second power feeding coil Lt10b is formed by winding a wire Wt10b around a magnetic core Ct10b. The magnetic cores Ct10a and Ct10b are connected to each other through the magnetic body F10. That is, the power feeding coil unit Ltu10 in Comparative Example is equivalent to a configuration in which the first auxiliary coil Lca and the second auxiliary coil Lcb are excluded from the power feeding coil unit Ltu1 of the wireless power transmission device S1 in Example. The power receiving coil Lr10 is a solenoid coil wound in a helical shape, and is formed by winding a wire Wr10 around a magnetic core Cr10 shaped into a plate or a bar. The power receiving coil Lr10 in Comparative Example is similar to the power receiving coil Lr in the wireless power transmission device S1 in Example.

Here, in Example and Comparative Example, a Litz wire with a diameter of approximately 6 mm which is formed by twisting approximately 4000 polyimide-coated copper wires each having a diameter of 0.05 mm was used for each of the wires Wta, Wtb, Wt10a, and Wt10b of the first and second power feeding coils Lta, Ltb, Lt10a, and Lt10b, the wires Wca and Wcb of the first and second auxiliary coils Lca and Lcb, and the wires Wr and Wr10 of the power receiving coils Lr and Lr10. In addition, ferrite cores of the same material (with a relative magnetic permeability of approximately 3000) were used for the magnetic cores Cta, Ctb, Ct10a, and Ct10b of the first and second power feeding coils Lta, Ltb, Lt10a, and Lt10b, the magnetic cores Cca and Ccb of the first and second auxiliary coils Lca and Lcb, the magnetic bodies F1 and F10, and the magnetic cores Cr and Cr10 of the power receiving coils Lr and Lr10.

Furthermore, in the power feeding coil unit Ltu1 in Example, the magnetic body F1 having a length of 700 mm, a width of 300 mm, and a thickness of 20 mm, the magnetic cores Cta and Ctb of the first and second power feeding coils Lta and Ltb each having a length of 100 mm, a width of 300 mm, and a thickness of 20 mm, the magnetic cores Cca and Ccb of the first and second auxiliary coils Lca and Lcb each having a length of 100 mm, a width of 300 mm, and a thickness of 20 mm, and the magnetic core Cr of the power receiving coil Lr having a length of 400 mm, a width of 200 mm, and a thickness of 10 mm were used. In the power feeding coil unit Ltu10 in Comparative Example, the magnetic body F10 having a length of 700 mm, a width of 300 mm, and a thickness of 20 mm, the magnetic cores Ct10a and Ct10b of the first and second power feeding coils Lt10a and Lt10b each having a length of 100 mm, a width of 300 mm, and a thickness of 20 mm, and the magnetic core Cr10 of the power receiving coil Lr10 having a length of 400 mm, a width of 200 mm, and a thickness of 10 mm were used.

Moreover, in the power feeding coil units Ltu1 and Ltu10 in Example and Comparative Example, the number of turns of each of the first and second power feeding coils Lta, Ltb, Lt10a, and Lt10b was set to 15, and the number of turns of each of the power receiving coils Lr and Lr10 was set to 10. In the power feeding coil unit Ltu1 in Example, furthermore, the number of turns of each of the first and second auxiliary coils Lca and Lcb was set to 10.

In each of Example and Comparative Example, the distance between the power feeding coil unit and the power receiving coil was set to 100 mm.

Then, in Example and Comparative Example, the power transmission efficiency and the unwanted leakage magnetic field were measured. This measurement was conducted with no displacement of the power receiving coil, that is, with the distance between the power feeding coil unit and the power receiving coil being kept at 100 mm while the distance between the center of the power receiving coil and the center of the power feeding coil unit was also 100 mm. The supply power of the power source PW was adjusted so that the power to be supplied to the load R became equal to 1.5 kW.

The power transmission efficiency was measured as follows: The efficiency between the power feeding coil unit and the power receiving coil was calculated by measuring the power supplied from the power source PW and the power supplied to the load R while taking into account the loss at the inverter INV and the loss at the rectifier circuit DB, which were measured in advance.

The unwanted leakage magnetic field was determined using, as an index, the magnetic field strength at a position 10 m away from the center of the power feeding coil unit. A loop antenna was placed at a position 10 m away from the center of the power feeding coil unit in the axial direction of the power receiving coil to measure a magnetic field strength. Here, the loop antenna was used to measure the magnetic field strengths in three orthogonal directions (X, Y, and Z directions), and the magnetic field strengths were combined to calculate a leakage magnetic field strength. Note that the power feeding coil unit was placed at a height of 400 mm from the floor surface with a power transmitting surface thereof facing upward, and the power receiving coil was placed above the power feeding coil unit with an interval of 90 mm between them. In addition, the loop antenna was placed in such a manner that the center of the loop antenna was positioned at a height of 1.5 m from the floor of a radio-frequency (RF) anechoic chamber.

Figure 5:
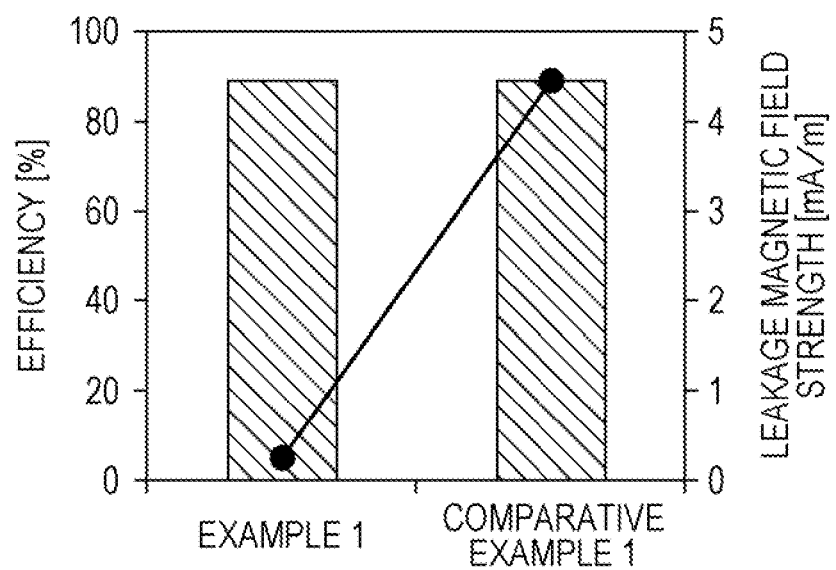
FIG. 5 depicts the results of measurement of the power transmission efficiency and the leakage magnetic field strength in Example according to the present invention and Comparative Example.

Measurement results are shown in FIG. 5. FIG. 5 depicts the results of the measurement in Example and Comparative Example. In FIG. 5, a bar graph depicts power transmission efficiency, and a line graph depicts leakage magnetic field strength.

As illustrated in FIG. 5, compared to Comparative Example, Example exhibits substantially equal power transmission efficiency and lower leakage magnetic field strength. That is, the auxiliary coil in Example (i.e., the first and second auxiliary coils Lca and Lcb) does not cancel out a magnetic flux contributing to power transmission, and thus a reduction in power transmission efficiency auxiliary coil is prevented, compared to Comparative Example. In Example, furthermore, the auxiliary coil cancels out a magnetic flux that forms the unwanted leakage magnetic field, and thus the leakage magnetic field strength is significantly reduced, compared to Comparative Example in which no auxiliary coil is provided. In the manner described above, it has been found that the power feeding coil unit Ltu1 in Example is capable of preventing or minimizing a reduction in power transmission efficiency while reducing the unwanted leakage magnetic field.

The present invention has been described with reference to an embodiment thereof. Such an embodiment is illustrative, and it is to be understood by a person skilled in the art that various modifications and changes can be made within the scope of the present invention and that such modifications and changes also fall within the scope of the present invention. Accordingly, the description given herein and the drawings taken in conjunction therewith are to be illustrative but not restrictive.

What is claimed is:

1. A power feeding coil unit for wirelessly feeding power, comprising:
    a first power feeding coil and a second power feeding coil that are apposed, the first power feeding coil and the second power feeding coil generate a first magnetic flux;
    a first auxiliary coil on a rear side of the first power feeding coil, the first auxiliary coil generates a second magnetic flux interlinking with the first power feeding coil; and
    a second auxiliary coil on a rear side of the second power feeding coil, the second auxiliary coil generates a third magnetic flux interlinking with the second power feeding coil, wherein
    the first magnetic flux interlinks with the first power feeding coil and the second power feeding coil due to a magnetic field generated by the first power feeding coil and a magnetic field generated by the second power feeding coil,
    an axial direction of the first auxiliary coil is nonparallel to an axial direction of the first power feeding coil,
    an axial direction of the second auxiliary coil is nonparallel to an axial direction of the second power feeding coil, and
    a direction of circulation of the second magnetic flux and the third magnetic flux are opposite to a direction of circulation of the first magnetic flux.

2. The power feeding coil unit according to claim 1, wherein
    each of the first power feeding coil and the second power feeding coil includes a magnetic core, and each of the first auxiliary coil and the second auxiliary coil includes a magnetic core,
    the magnetic core of the first power feeding coil is coupled to the magnetic core of the first auxiliary coil, and
    the magnetic core of the second power feeding coil is coupled to the magnetic core of the second auxiliary coil.

3. The power feeding coil unit according to claim 1, wherein
    the first auxiliary coil is arranged so that part or all of the first auxiliary coil overlaps the first power feeding coil, and
    the second auxiliary coil is arranged so that part or all of the second auxiliary coil overlaps the second power feeding coil.

4. The power feeding coil unit according to claim 1, wherein
    the axial direction of the first auxiliary coil is substantially perpendicular to the axial direction of the first power feeding coil, and
    the axial direction of the second auxiliary coil is substantially perpendicular to the axial direction of the second power feeding coil.

5. A wireless power transmission device for wirelessly transmitting power, comprising:
    the power feeding coil unit according to claim 1; and
    a power receiving coil that is a helical-shaped coil including a magnetic core and a wire wound around the magnetic core.

6. The power feeding coil unit according to claim 2, wherein
    the first auxiliary coil is arranged so that part or all of the first auxiliary coil overlaps the first power feeding coil, and
    the second auxiliary coil is arranged so that part or all of the second auxiliary coil overlaps the second power feeding coil.

7. The power feeding coil unit according to claim 2, wherein
    the axial direction of the first auxiliary coil is substantially perpendicular to the axial direction of the first power feeding coil, and
    the axial direction of the second auxiliary coil is substantially perpendicular to the axial direction of the second power feeding coil.

8. The power feeding coil unit according to claim 3, wherein
    the axial direction of the first auxiliary coil is substantially perpendicular to the axial direction of the first power feeding coil, and
    the axial direction of the second auxiliary coil is substantially perpendicular to the axial direction of the second power feeding coil.

9. The power feeding coil unit according to claim 6, wherein
    the axial direction of the first auxiliary coil is substantially perpendicular to the axial direction of the first power feeding coil, and
    the axial direction of the second auxiliary coil is substantially perpendicular to the axial direction of the second power feeding coil.

10. A wireless power transmission device for wirelessly transmitting power, comprising:
    the power feeding coil unit according to claim 2; and
    a power receiving coil that is a helical-shaped coil including a magnetic core and a wire wound around the magnetic core.

11. A wireless power transmission device for wirelessly transmitting power, comprising:
    the power feeding coil unit according to claim 3; and
    a power receiving coil that is a helical-shaped coil including a magnetic core and a wire wound around the magnetic core.

12. A wireless power transmission device for wirelessly transmitting power, comprising:
    the power feeding coil unit according to claim 6; and a power receiving coil that is a helical-shaped coil including a magnetic core and a wire wound around the magnetic core.

13. A wireless power transmission device for wirelessly transmitting power, comprising:
the power feeding coil unit according to claim 4; and
a power receiving coil that is a helical-shaped coil including a magnetic core and a wire wound around the magnetic core.

14. A wireless power transmission device for wirelessly transmitting power, comprising:
the power feeding coil unit according to claim 7; and
a power receiving coil that is a helical-shaped coil including a magnetic core and a wire wound around the magnetic core.

15. A wireless power transmission device for wirelessly transmitting power, comprising:
the power feeding coil unit according to claim 8; and
a power receiving coil that is a helical-shaped coil including a magnetic core and a wire wound around the magnetic core.

16. A wireless power transmission device for wirelessly transmitting power, comprising:
the power feeding coil unit according to claim 9; and
a power receiving coil that is a helical-shaped coil including a magnetic core and a wire wound around the magnetic core.

\* \* \* \* \*